July 12, 1949.   N. ALBERTI ET AL   2,475,935
AIRCRAFT GUN MOUNT
Filed Oct. 3, 1945   2 Sheets-Sheet 1
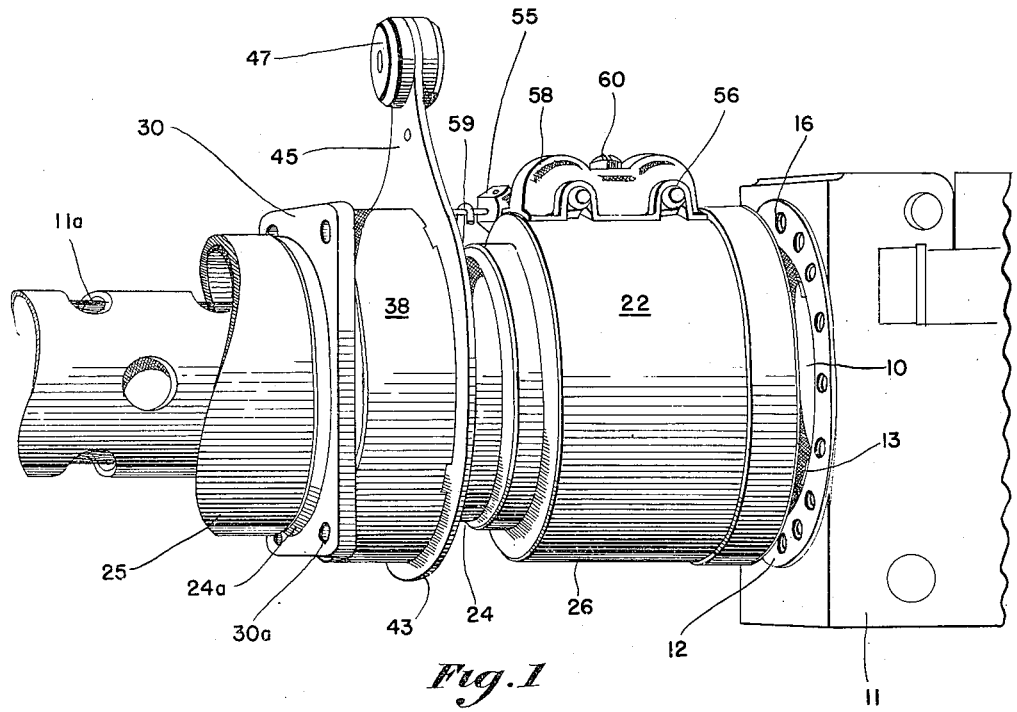
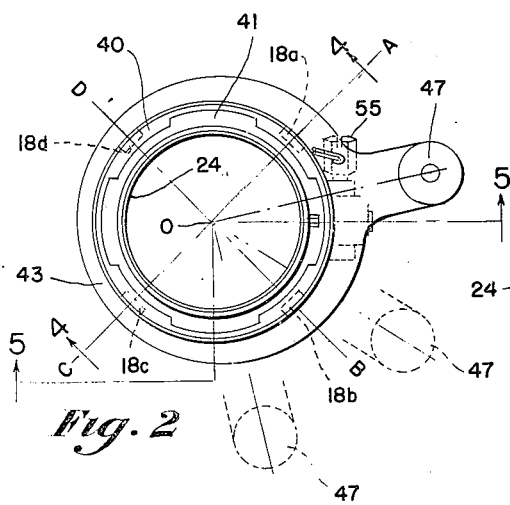
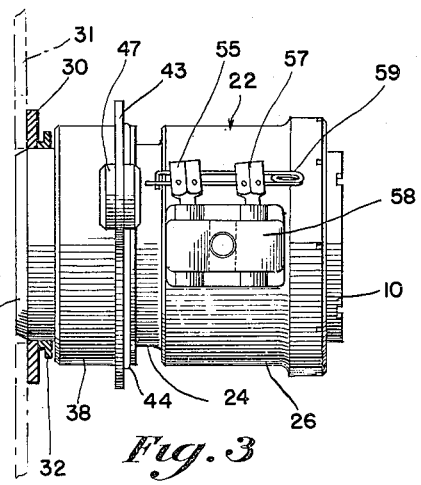
Nicholas Alberti INVENTOR.
and George A. Bronson
BY
James M. Clark
Attorney July 12, 1949.    N. ALBERTI ET AL    2,475,935
AIRCRAFT GUN MOUNT
Filed Oct. 3, 1945    2 Sheets-Sheet 2

Nicholas Alberti INVENTOR.
and George A. Bronson
BY James M. Clark
Attorney

Patented July 12, 1949

2,475,935

UNITED STATES PATENT OFFICE 2,475,935

AIRCRAFT GUN MOUNT

Nicholas Alberti, Paw Paw, Mich., and George A. Bronson, Santa Monica, Calif., assignors to Douglas Aircraft Company, Inc., a corporation of Delaware Application October 3, 1945, Serial No. 619,986

10 Claims. (Cl. 89—37.5)

1

The present invention relates to aircraft armament and ordnance and is more particularly concerned with improvements in the adjustable mounting of relatively fixed machine guns in aircraft and other vehicles.

In certain types of combat aircraft it has been found desirable to mount relatively fixed guns, usually within the aircraft wing, and also in the fuselage and other parts, these guns being locked into their adjusted positions prior to flight as distinguished from the flexible type machine gun installations which are aimed and operated during flight by a gunner, or through suitable remote control means. In these relatively fixed gun installations it is desirable that the mount be relatively simple, compact and light in weight but sufficiently sturdy and rigid to withstand and transmit the recoil loads to the adjacent aircraft structure. Many prior type fixed gun mounts have fallen short of the foregoing requirements and in addition have been unduly complicated and difficult to replace, service or adjust the gun for aiming or bore sighting. It is also desirable to avoid "throwing" of the gun during firing, with the resultant scattering of the shots, which condition frequently results from the usual manner of supporting the gun at two points spaced along the length of the gun and laterally offset from its longitudinal axis or bore. The gun mount of the present invention is considered to overcome these objections and disadvantages and to provide in addition numerous advantages not heretofore obtained in fixed gun mounts.

It is accordingly a major object of the present invention to provide an improved gun mount of the relatively fixed type. It is a further object to provide a single or one-point mounting for a machine gun in which the recoil forces are uniformly transmitted closely and directly into the adjacent supporting structure obviating "throwing" of the gun. It is a further object to provide a gun mount of this type which is quickly and readily attached and detached from the aircraft structure and which facilitates rapid installation, servicing and removal or replacement of the gun.

A further object of this invention resides in the provision of simple and readily accessible means for adjusting the gun and facilitating bore sighting. A further object lies in the provision of a relatively light gun mount which is of great strength and rigidity and has a high strength-to-weight ratio. A further object resides in the novel use of the blast tube of the gun to transmit cantilever loads to the nose of the wing in addition to its normal function. A further object of the invention resides in the provision of a quick disconnect feature which permits removal of the gun and the mount adjusting mechanism by the motion of a single readily accessible handle. A further object resides in the provision of vertical and horizontal adjustment means which are located side by side to provide greater accessibility than has been attained in most prior gun mounts.

Other objects and advantages of the present invention will occur to those skilled in the art after reading the present specification taken together with the accompanying drawings forming a part hereof, in which:

Fig. 1 is a perspective view taken from the side showing a preferred form of the present gun mount in relationship to a machine gun;

Fig. 2 is a front elevational view of the quick disconnect feature of the mount;

Fig. 3 is a plan view of the mount and its relationship to the adjacent supporting structure;

Figure 6:
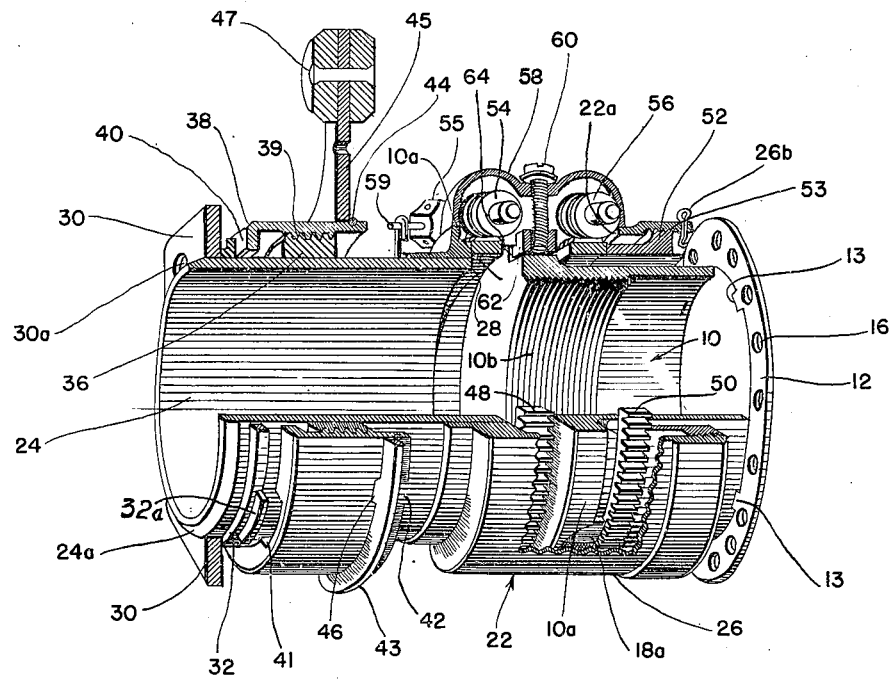
Fig. 6 is an enlarged quarter cross-sectioned view of the present mount.

Referring now to Figs. 1 and 6, the preferred form of the present gun mount comprises a tubular adapted portion 10 the threads 10b of which engage the usual screw threads on the gun 11. The adapter 10 is concentrically mounted within an enlarged portion 26 of a housing 22 which has a reduced forwardly extending tubular portion 24. A forwardly extending blast tube 25 is attached to the chamfered end 24a of the tubular portion 24 and is concentrically disposed in the usual manner about the barrel 11a of the gun. The adapter 10 is locked in position on the gun 11 by an annular washer 12 having inwardly projecting teeth 13 which engage in notches 14 at the rear end of the adapter. The washer 12 is also provided with a series of holes 16 one of which is engaged by a retractable pin (not shown) mounted on the breech housing of the gun 11.

Figures 4, 5:
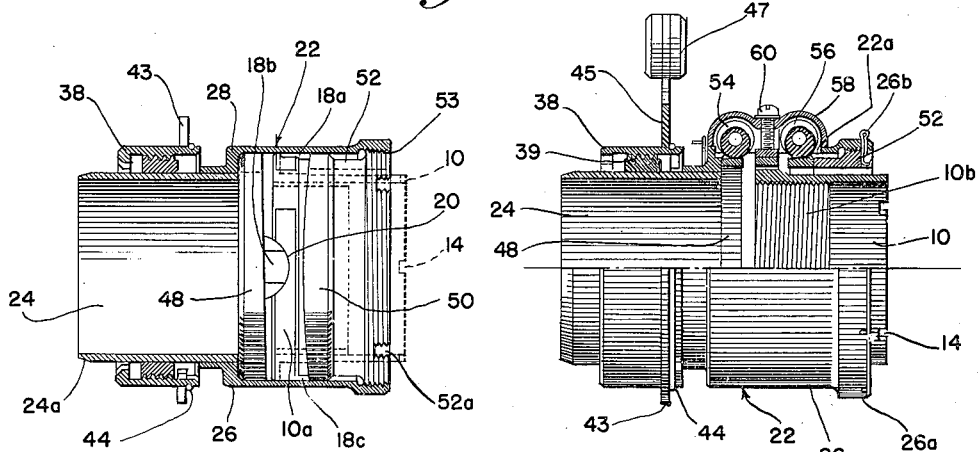
Fig. 4 is a cross-sectional view as taken along the lines 4—4 of Fig. 2 showing a portion of the adjusting mechanism.
Fig. 5 is a part cross-sectional view of the mount as taken along the lines 5—5 of Fig. 2.
Figure 4A:
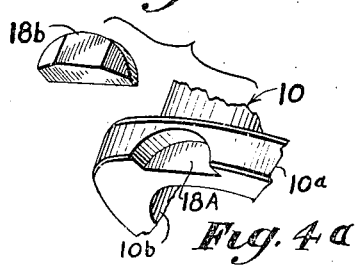
Fig. 4a is a fragmentary perspective view of a portion of the adjusting mechanism to an enlarged scale.

The adapter 10 carries at its forward end an integral outwardly projecting flange 10a which serves to receive a series of segmental guide blocks or keys 18a, 18b, 18c and 18d. These guide blocks are in the form of half discs seated in correspondingly semi-circular-shaped recesses 20, as indicated for the disc 18b in Fig. 4, in the outer periphery of the transverse flange 10a. These guide or bearing blocks 18a—18d extend alternately to opposite vertical faces of the flange 10a. In other words the discs 18b and 18d have their flattened faces toward the left, whereas the two adjacent or intermediate discs 18a and 18c, disposed 90 degrees to each side of the disc 18b, have their flattened faces toward the opposite direction, or to the right in Fig. 4. Similarly a disc 18d which would be oppositely disposed with respect to the disc 18b, or 180 degrees as measured rotatively about the gun bore, would also have its flattened surface facing in the same direction, namely toward the left. The straight edges of the guide pieces 18a, 18b, 18c and 18d extend beyond the vertical faces of the flange 10a and engage adjustment means which will be hereinafter described. As shown in Fig. 4a, the arcuate recesses for the guide blocks 18a to 18d inclusive, for which the recess 18A in this figure is typical, are defined by flat bottom surfaces and semi-circular or arcuate end surfaces. Each guide block, as for example the guide block 18b in this figure, has corresponding flat bottom surfaces and semicircular end surfaces to permit their rocking or swivelling within the parts 10. The thickness in the radial direction of the guide blocks, as indicated by the block 18b in this figure, is preferably somewhat less than the depth of the recess 18A and the ends of the guide blocks are beveled or chamfered such that they remain beneath the projected cylindrical outer surface of the hub portion 10a in order to sufficiently clear the inner surface of its enclosure or housing.

The housing assembly 22 is formed by the abovementioned tube 24 being welded to the tubular piece 26 of somewhat greater diameter than the tube 24, the larger diameter tubular piece being reduced at its forward end to set upon and be welded to the inner tube 24. A shoulder 28 is formed at the point of juncture of the tube 24 and the tubular piece 26, serving as an abutting surface for the adjusting member to be later described. The tube 24 carries at its forward end a clamping or quick disconnect means for attaching the mount to the special bracket which is carried by the airplane structure from which the gun projects and is supported. A preferred form of bracket is shown by way of example as a simple flat plate 30 provided with a plurality of bolt holes 30a through which it may be secured to the wing spar web or other aircraft structure 31 as indicated by the broken lines in Fig. 3. The mounting plate 30 is suitably apertured for the passage of the forward chamfered end 24a of the tube 24 and has fixedly attached thereto a flange 32 which surrounds the aperture in the plate and is formed with a plurality of interrupted upstanding lugs 32a adapted to form a bayonet type connection with a member later described.

The exterior surface of the tube 24 has a ring 36 welded or otherwise attached thereto, the outer periphery of this ring being furnished with a thread 39, preferably of the Acme standard. An annular retaining piece 38 having an inwardly turned interrupted lip or flange 40 at its forward portion which in turn has notches 41 corresponding to the intervals of interruption in the lip or lugs 32a carried by the flange 32 on the bracket 30 for complementary engagement therewith. This retaining piece 38 is thickened inwardly toward its rear edge and the inner surface of this thickened portion is also preferably provided with an Acme thread 39 mating with the like thread on the exterior of the ring 36. The rearward edge of the retaining piece 38 is furnished with notches 42 engaged by a locking lever or ring 43 formed with a plate or washer-like engaging portion having inwardly projecting teeth 46 adapted to engage with the notches 42. The locking or disconnect lever 43 has a radially projecting arm or handle portion 45 provided with an operating knob or grip 47. In order to lock the entire assembly, it will be understood that the notches 41 of the flange 40 of member 38 when moved forward will be matched with the lugs 32a, which pass therethrough to permit locking with the bayonet flange 32. By means of the operating member 43—47, the locking member 38 can be rotated after matching engagement of the notches 41 with the lugs 32a of the flange 32 on the bracket 30 to draw the gun mount securely into position. The respective parts are initially adjusted so that a part turn of the knob 47 will securely lock the gun mount to the bracket. A similar reverse movement of the knob 47 will completely release the gun and its mount from its bracket 30. The operating member 43—47 is retained in position on the annular piece 38 by means of the snap ring 44 engaging an annular groove formed in the outer surface of the retaining piece 38.

Adjustment between the adapter 10 and the tubular assembly 22 for the aiming or bore-sighting of the gun is made through a cut-out portion 22a as indicated at the top of Fig. 6. The tubular piece 26 is cut-out at 22a and manually operated means for adjusting the gun are secured in the housing 58 which is clamped over this cut-out portion. The adjustment means comprises essentially two wedge gears 48 and 50, these gears as indicated in Fig. 4, being much wider at one side than at the diametrically opposite side. The edges of the gears are, however, uniformly tapered between the high and low points on one side of each of the gears and the remaining opposite sides of each gear lie in single transverse planes. The wedge gears 48 and 50 are guided for rotary movement by their outer peripheries which fit snugly within the enlarged bore portion 26 of the supporting housing 22. The wedge gear 48 is arranged between the shoulder 28 and the straight projecting edges of the aforementioned guide pieces 18b and 18d projecting from the forward vertical face of the flange 10a of the adapter member 10. The cam or wedge gear 50 is arranged against the projecting straight faces of the guide members 18a and 18c at the rear face of the projecting flange 10a of the adapter member 10 and is maintained in contact therewith by the threaded retainer ring 52 which is screwed into the threaded rear end of the housing member 26 at its thickened hub portion 26a. These threads are indicated at 53 in Fig. 6 and are locked in position by the cotter pin 26b passing through the hub wall 26a and one of the notches 52a in the ring 52.

Within the housing 58 clamped over the opening 22a in the housing 22 there are provided rotatable adjusting worms 54 and 56 in meshing engagement with the wedge gears 48 and 50 respectively. The shaft portions of these worms are journalled within the housing 58 and project through the rear of the housing where these shafts are formed into the adjusting nut portions 55 and 57 respectively. These nut portions of the worms provide the means for readily adjusting the adapter 10 and the attached machine gun 11 both vertically and horizontally with respect to the fixed casing 22 and the aircraft structure indicated generally at 31, to which the casing is attached. The adjusting nuts are held in position by the locking pin 59.

The housing 58 is clamped over the cut-out portion 22a by means of the threaded stud 60 which is screwed into the oblong block 62 arranged with its longer dimension transverse to the longitudinal axis of the mount. The block 62 engages in a recess 64 in the thickened flange 10a and extends at its ends under the tubular piece 26. The nut or block 62 is manually held in position before placing the housing over the adapter 10 and the housing 58 is retained by tightening the screw 60.

Where the mount is used for the support of a fixed gun in an aircraft wing, the web of its main spar as indicated at 31 in Figure 3 is provided with a suitable orifice and has permanently attached thereto the flanged mounting ring 30—32. In such installations the blast tube 25 is extended forwardly to the leading edge or nose of the wing, wherein it serves to carry the cantilever loads to the nose of the wing and to the spar, thereby giving a more rigid mount than could be obtained by mounting to the wing spar only.

To install the gun within the mount the adapter 10 and the locking ring 12 are first slipped down over the gun barrel and engaged with the usual threads provided on the gun. As the threads are tightened to the proper position the locking ring 12 with its teeth 13 engaging the notches 14 of the adapter is rotatively adjusted with the adapter 10 to a position in which one of the holes 16 aligns with the retractable pin in the breech portion of the gun. The supporting casing portion 22 is then assembled about the adapter 10 with the wedge rings 48 and 50 disposed on opposite sides of the adapter flange 10a and the adjusting worms 54 and 56 engaged therewith and covered by the housing 58 attached to the screw 60. The gun and its tubular mount are then inserted in the wing and into the aperture in the mounting plate 30 attached to the spar 31. After alignment of the lip 40 of the retaining sleeve 38 with the interrupted portion of the flange 32, and upon a part turn of the quick disconnect handle 47, the gun, its mount and all of the adjusting mechanism is rigidly fastened to the wing structure. There is no rear support for the gun since the gun mount itself is used to support its own weight as well as that of the internal mechanism of the gun. The gun recoil loads are accordingly taken directly into the spar or bulkhead web without the necessity of an irregular or offset forging or other parts necessary in prior mounting devices.

After the machine gun is installed in a fixed position within a wing or other part of an aircraft it is necessary that it be accurately aimed or bore-sighted in order that the fire of the several guns of the aircraft converge at a given range upon a single point or target. This is accurately and rapidly accomplished by the aiming or adjusting means embodied in the present gun mount. Referring now to Figure 2, particularly the relative position of the discs or keys 18a, 18b, 18c and 18d which are indicated in diametrically opposed positions 90 degrees apart as measured rotatively about the axis O of the gun bore. Inasmuch as this view is taken looking from the muzzle toward the breech of the gun, the flat or plane edges of the discs 18b and 18d will be facing toward the reader and the gear 48 and the corresponding flat edges of the discs 18a and 18c will be facing away from the reader, or against the rear wedge gear 50.

Considering both Figs. 2 and 4 it will be noted that after the threaded locking sleeve 52 has been backed out sufficiently to permit rotation of the adjusting mechanism, when the wedge gear 48 is rotated by its worm 54 in a clockwise direction as viewed in Fig. 2, the narrower portion of its width or face is brought toward the disc 18b and the gradually widening portion of its face is brought against the lower disc 18d. Inasmuch as these discs lie along the plane passing through the axis O indicated by the lines B—D in Figure 2, the abutment or flange 10a of the adapter 10, together with the attached gun, will be rocked about a center lying on the axis O and preferably between the faces of the flange 10a, towards the side represented by the letter D or the disc 18d, along the plane D—B, away from the side B.

Similarly rotation of the wedge gear 50 by its worm 56 in a clockwise direction will cause the tapered edge of this gear to bear against the disc 18c and to rock the adapter and its gun bore along the plane C—A from the side C toward the side A at which the narrowing face of the gear 50 has been brought around opposite the straight face of the disc 18a. It will be noted that as the flange 10a of the adapter is rocked about its center of adjustment, similar to a four-point gimbal mounting, the discs 18a—18d which are required to follow the tapering inside edges of the web gears 48 and 50 are permitted to rotate about radial axes within their arcuate seats 20 provided at alternately opposite sides of the flange or abutment of the adapter. Obviously, where a gun has to be aimed or sighted to a point intermediate any of the four points defining the traverse and elevation direction indicated in Fig. 2, the aiming is accomplished by a combined or component adjustment of the two opposed cam gears. In other words if the gun is to be aimed upwardly in Fig. 2 at a point between the planes defined by the lines D—O and A—O, this is readily accomplished by rotating both ring gears such that their widening face portions come in contact with the keys 18c and 18d, keeping in mind of course that the key 18c pushes the adjacent flange portion forwardly toward the muzzle of the gun, and 18d pushes the adjacent flange portion rearwardly away from the gun muzzle. When the gun has been accurately bore-sighted and both portions of the adjusting mechanism properly set, the locking sleeve 52 is brought into contact against the edge of the wedge gear 50 which in turn is bearing against the discs 18a and 18c. The sleeve 52 is then locked in its adjusted position by insertion of the safety pin 26b.

It will accordingly be noted that a very efficient light weight, single-point support, gun mount has been provided. The vertical and horizontal adjustment knobs are located side-by-side where they provide greater accessibility than is possible with most prior mounts. The present gun mount has been found to hold its aim without "throwing" the gun to a far greater extent than prior mounts. This is principally due to its single-point mounting arrangement in which the recoil loads are evenly and coaxially distributed, without the development of couples or bending moments, for the relatively short distance between the threads on the gun as engaged by the adapter threads 10b, to the quick disconnection at the spar mounting flange 30—32. The efficiency and high strength-to-weight ratio of the gun mount is also contributed to by the dual function of the blast tube which is utilized for structure to support the gun in addition to its normal purpose of protecting the wing structure against blast. It should also be noted that all of the adjustment and disconnection handles can be brought close together to be accessible either from above or from any convenient direction to permit rapid servicing, adjustment and replacement.

Other forms and modifications of the present invention both with respect to its general arrangement and the details of its several parts, which will occur to those skilled in the art after reading the present specification, are intended to come within the scope and spirit of the present invention as more particularly set forth in the appended claims.

We claim:

1. In a gun mount comprising an outer tubular member attached to a supporting structure, an inner tubular member attached to a gun, and a flange carried by said inner tubular member, means for adjusting the relationship between said tubular members including a pair of annular rings of uniformly varying length in the axial direction journalled within said outer member one at each side of said flange, and means to rotate said annular adjustment rings.

2. A gun assembly comprising a gun having a tubular adapter mounted thereon, transverse abutment means having oppositely disposed faces carried by said adapter, a tubular supporting member coaxially disposed about said gun and adapter, a pair of rotatable cam rings journalled within said supporting member in contact with the faces of said abutment means and means to separately rotate said cam rings for the adjustment of said gun and adapter with respect to said supporting member.

3. An aircraft gun support comprising an adapter member attached to said gun, a transverse flange carried by said adapter member, a support member surroundingly disposed with respect to said flange-carrying adapter member and attached to the aircraft structure, and annular adjustment rings of varying length in the axial direction disposed in a bearing relationship between said flange and said support member for the adjustment of said gun adapter member and said gun with respect to said structure and the transmission of recoil from said adapter flange into said support member.

4. A tubular mount for a machine gun comprising a tubular supporting member having an intermediate internal shoulder, a tubular member attached to the gun, said tubular member having a transverse abutment, bearing discs journaled within said abutment, an annular gear of uniformly varying face dimension adapted to bear at one side against said internal shoulder and at its opposite side against the bearing discs journaled within said abutment, means to rotate said gear for adjusting the relationship between said inner and outer tubular members and means disposed on the opposite side of said abutment arranged for the transmission of recoil forces from said gun into said tubular supporting member.

5. A mount for a machine gun comprising a tubular member fastened to said gun, a transverse flange carried by said tubular member about the axis of the bore of said gun, a tubular mounting member releasably attachable to a supporting structure and co-axially disposed in surrounding relationship with respect to said first member flange, a pair of transversely tapering adjustment rings rotatably journalled within said second member at each side of said transverse flange and means for separately rotating said rings for the adjustment of said flange-carrying member and said gun with respect to the supporting structure.

6. In a machine gun mount including an outer shouldered tubular member and an inner flanged member attached to a gun, means for adjusting the relationship of said gun with respect to said outer tubular member comprising an annular gear journalled within said outer tubular member against said shouldered portion, the face of said gear uniformly varying from a plane edge in contact with said shouldered portion to a tapering edge in contact with the flanged portion of said inner tubular member and manual means to rotate the said ring gear for adjustment between said gun and said outer tubular member.

7. A gun assembly comprising a gun having a tubular sleeve mounted thereon, said sleeve having a transverse abutment portion, a tubular support member having a bore portion of greater diameter than said abutment portion to clearingly receive said abutment, annular adjustment cams disposed within said bore portion one at each side of said abutment with their cam faces in contact therewith, means carried by said support member to guidingly retain said cams and the embraced abutment of said sleeve in their adjusted positions.

8. In a tubular mount for an aircraft machine gun including a supporting structure, an outer shouldered tubular member releasably attachable to said supporting structure, an inner flange-carrying member releasably attachable to a machine gun, said outer tubular member having an enlarged bore portion terminating in said shoulder adapted to be surroundingly disposed with respect to said inner flange-carrying tubular member, said flange provided with two pairs of diametrically disposed self-adjusting bearing portions each pair disposed on either side of said flange, annular adjusting gears having plane outer edges and uniformly tapering inner edges disposed on opposite sides of said flange and in contact with said bearing portions, and adjusting worms in engagement with the teeth of said gears for rotating the same within said enlarged bore portion for the adjustment of said machine gun with respect to said supporting structure.

9. In a gun mount comprising a member attachable to a supporting structure and a flanged adapter attachable to a gun, means for adjusting the relationship between said member and said flanged adapter including a pair of ring elements of uniformly varying lengths rotatably carried by said member for wedgingly engaging said flanged adapter.

10. In a gun mount comprising a member attachable to a supporting structure and a flanged adapter attachable to a gun, means for adjusting the relationship between said member and said flanged adapter including a pair of ring elements of uniformly varying lengths in the axial direction rotatably carried by said member for wedgingly engaging the ends of said flanged adapter, and means for rotating said ring elements.

NICHOLAS ALBERTI.
GEORGE A. BRONSON.

REFERENCES CITED

The following references are of record in the file of this patent:

UNITED STATES PATENTS

| Number | Name | Date |
|---|---|---|
| 2,397,687 | Olmore | Apr. 2, 1946 |